United States Patent

Cikanek, Jr. et al.

Patent Number: 5,813,388
Date of Patent: Sep. 29, 1998

[54] HEATED ASSEMBLY FOR VAPORIZATION OF FUEL IN AN INTERNAL COMBUSTION ENGINE

[75] Inventors: Harry Arthur Cikanek, Jr., Northville; George Carver Davis, Ann Arbor, both of Mich.

[73] Assignee: Ford Motor Company, Dearborn, Mich.

[21] Appl. No.: 784,217

[22] Filed: Jan. 16, 1997

[51] Int. Cl.⁶ .............................. F02M 1/08; F02M 31/00
[52] U.S. Cl. ...................................... 123/549; 123/179.21
[58] Field of Search .................................... 123/549, 557, 123/545, 546, 547, 179.21

[56] References Cited

U.S. PATENT DOCUMENTS

| | | |
|---|---|---|
| 3,747,581 | 7/1973 | Kolb . |
| 4,020,812 | 5/1977 | Hayward . |
| 4,023,544 | 5/1977 | Cole . |
| 4,106,454 | 8/1978 | Henlis . |
| 4,114,580 | 9/1978 | Coats . |
| 4,121,543 | 10/1978 | Hicks, Jr. et al. . |
| 4,153,653 | 5/1979 | Moore . |
| 4,187,820 | 2/1980 | Webster et al. . |
| 4,308,845 | 1/1982 | Sarto ........................................ 123/549 |
| 4,384,563 | 5/1983 | Siefer et al. . |
| 4,387,676 | 6/1983 | Couceiro ............................ 123/179.21 |
| 4,491,118 | 1/1985 | Wooldridge . |
| 4,756,294 | 7/1988 | Nakayama et al. ..................... 123/549 |
| 5,007,402 | 4/1991 | Scherenberg ............................ 123/549 |
| 5,323,753 | 6/1994 | Cikanek, Jr. et al. . |

*Primary Examiner*—Marguerite McMahon
*Attorney, Agent, or Firm*—Donald A. Wilkinson, Esq.; Roger L. May, Esq.

[57] ABSTRACT

A heated assembly is provided for vaporization of fuel in an internal combustion engine. The heated assembly includes a grid disposed in an inlet runner of the internal combustion engine. The assembly also includes structure for heating the grid during cold start of the internal combustion engine and vaporizing fuel in the inlet runner of the internal combustion engine.

4 Claims, 4 Drawing Sheets

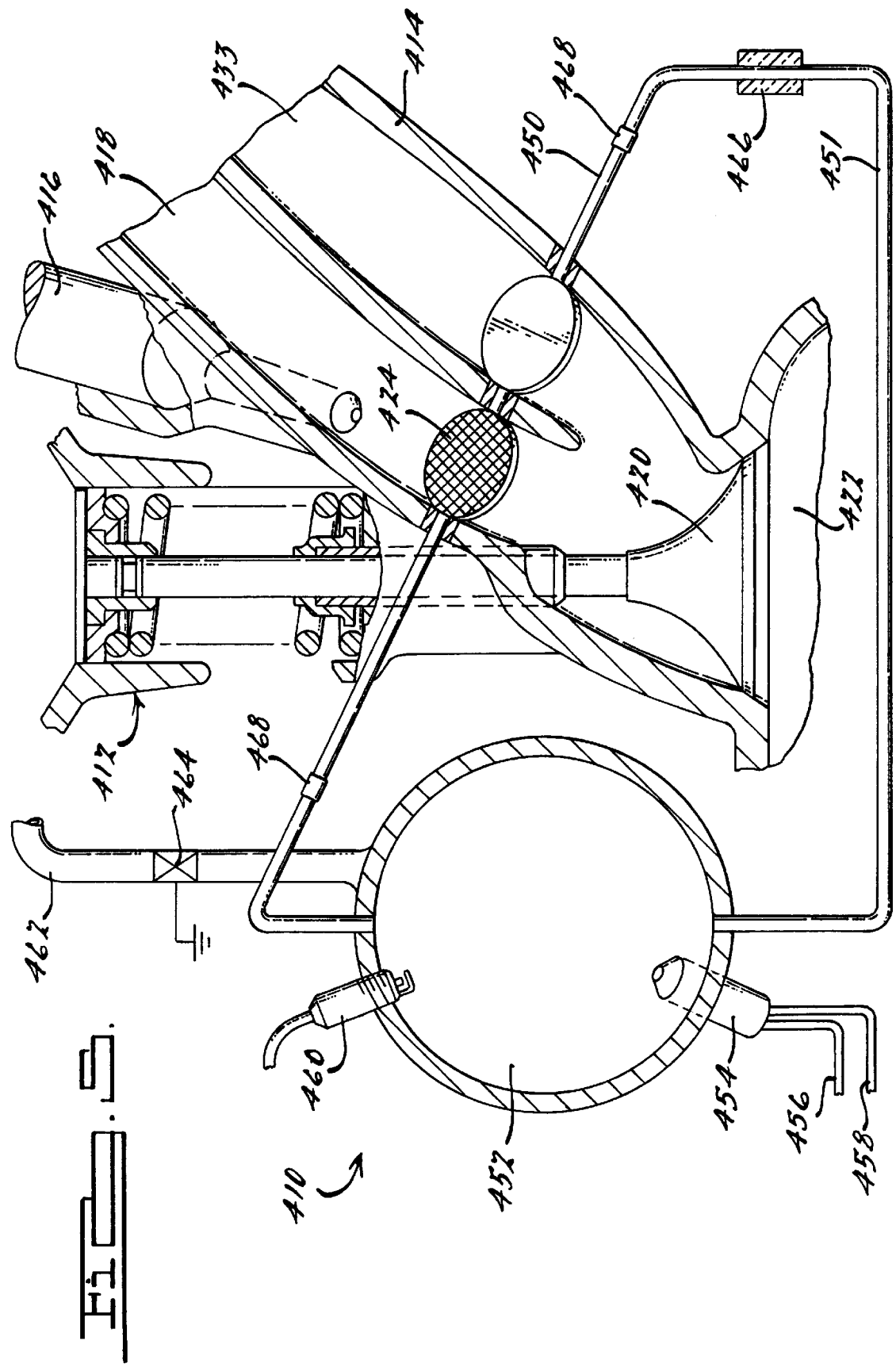

HEATED ASSEMBLY FOR VAPORIZATION OF FUEL IN AN INTERNAL COMBUSTION ENGINE

BACKGROUND OF THE INVENTION

1. Field of the Invention

The present invention relates generally to internal combustion engines and, more specifically, to a heated assembly for vaporization of fuel in an internal combustion engine.

2. Description of the Related Art

In a pre-mixed charge internal combustion engine which burns liquid fuel such as gasoline, it is necessary to generate a fuel-air mixture before combustion. This is accomplished by a fuel induction system comprising a carburetor or fuel injector. The ideal fuel-air mixture delivered to the intake manifold should be a homogeneous mixture of minute fuel particles in air to permit development of the maximum possible power. The mixture should have composition or strength to develop maximum economy for each condition of engine operation. When an engine is burning such an ideal fuel-air mixture, maximum combustion of the fuel is achieved while smoke and unburned fuel in the exhaust are held to a minimum.

The need for improving the fuel-air mixture in the combustion chamber has been recognized for many years. One solution to this problem has been to install a turbulence-inducing grid in an inlet runner of an internal combustion engine to induce fine turbulent structures and improve the atomization of fuel. U.S. Pat. No. 5,323,753 to Cikanek, Jr. et al. discloses the use of a grid in an induction system for an internal combustion engine. Although this grid has worked well, still there is a need in the art, during cold start, to improve fuel vaporization, reduce hydrocarbon (HC) emissions, and reduce fuel consumption while inducing fine turbulent structures into the combustion chamber of the internal combustion engine.

SUMMARY OF THE INVENTION

Accordingly, the present invention is a heated assembly for vaporization of fuel in an internal combustion engine. The heated assembly includes a grid disposed in an inlet runner of the internal combustion engine. The assembly also includes means for heating the grid during cold start of the internal combustion engine and vaporizing fuel in the inlet runner of the internal combustion engine.

One feature of the present invention is that a heated assembly is provided for vaporization of fuel in an internal combustion engine. Another feature of the present invention is that the heated assembly improves vaporization of incoming fuel spray and enhances mixing of the charge. Yet another feature of the present invention is that the heated assembly reduces, during "cold start", hydrocarbon emissions and fuel consumption while enhancing mixing through introduction of uniform turbulent structures into the combustion chamber. A further feature of the present invention is that the heated assembly improves idle efficiency without inhibiting peak power and torque.

Other features and advantages of the present invention will be readily appreciated as the same becomes better understood after reading the subsequent description when considered in connection with the accompanying drawings.

BRIEF DESCRIPTION OF THE DRAWINGS

FIG. 5 is a fragmentary elevational view of another heated assembly, according to the present invention, illustrated in operational relationship with an internal combustion engine having a grid rotatable with a throttle plate and chemically heated.

DESCRIPTION OF THE PREFERRED EMBODIMENT(S)

Figure 1:
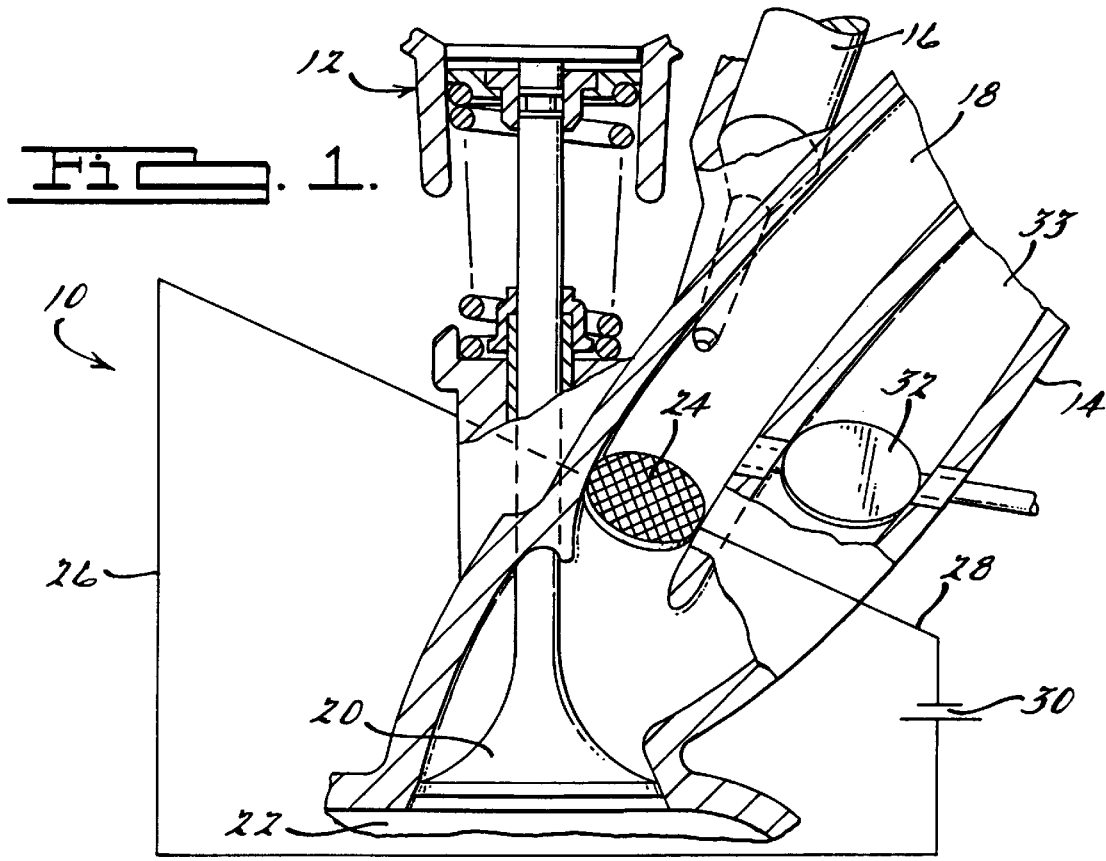
FIG. 1 is a fragmentary elevational view of a heated assembly, according to the present invention, illustrated in operational relationship with an internal combustion engine having a grid fixed in an inlet runner.

Referring to the drawings and in particular FIG. 1, one embodiment of a heated assembly 10 is illustrated in operational relationship with an internal combustion engine, generally indicated at 12. The internal combustion engine 12 has a dual port induction system 14 in which a fuel injector 16 sprays fuel into a primary flow or inlet runner 18. This fuel mixes with the air flowing through the primary inlet runner 18. The fuel-air mixture then passes through an inlet valve 20 and into a combustion chamber 22 where the mixture is ignited by a spark ignitor (not shown).

As illustrated in FIG. 1, the heated assembly 10 includes a turbulence-generating grid 24 fixed in place across the primary inlet runner 18 of the induction system 14. The grid 24 is made of electrical resistance wire. The heated assembly 10 also includes electric cables 26 and 28 connected to the grid 24 and a power source such as a battery 30 to heat the grid. Also, computer control cables may be connected to the grid 24 to control the heating of the grid 24. It should be appreciated that the electrical power flowing through the electrical resistance wire produces heat.

In operation of the heated assembly 10, the inlet charge is free to flow through primary inlet runner 18 under all engine operating conditions, subject to flow restriction by a primary throttle plate (not shown). Under high speed or "wide open throttle" conditions, a rotatable secondary throttle plate 32 disposed in a secondary inlet runner 33 of the induction system 14 is open in order to allow maximum flow. Under low speed or idle conditions, the secondary throttle plate 32 is closed. During cold start and cold idle conditions, the battery 30 supplies power through the electric cables 26 and 28 to heat the grid 24. Fuel spray from the fuel injector 16 strikes the heated grid 24. This causes increased fuel vaporization and enhanced mixing through the heated grid 24, thus reducing HC emissions and fuel consumption. This enhances mixing through the introduction of uniform turbulent structures into the combustion chamber 22. This also improves mixing of the trapped residual and incoming charge and idle combined efficiencies without inhibiting peak power and torque. It should be appreciated that when the "cold start/idle" operation phase is completed, power from the battery 30 is discontinued to the grid 24 and operation of the induction system 14 is resumed as outlined in U.S. Pat. No. 5,323,753.

Figure 2:
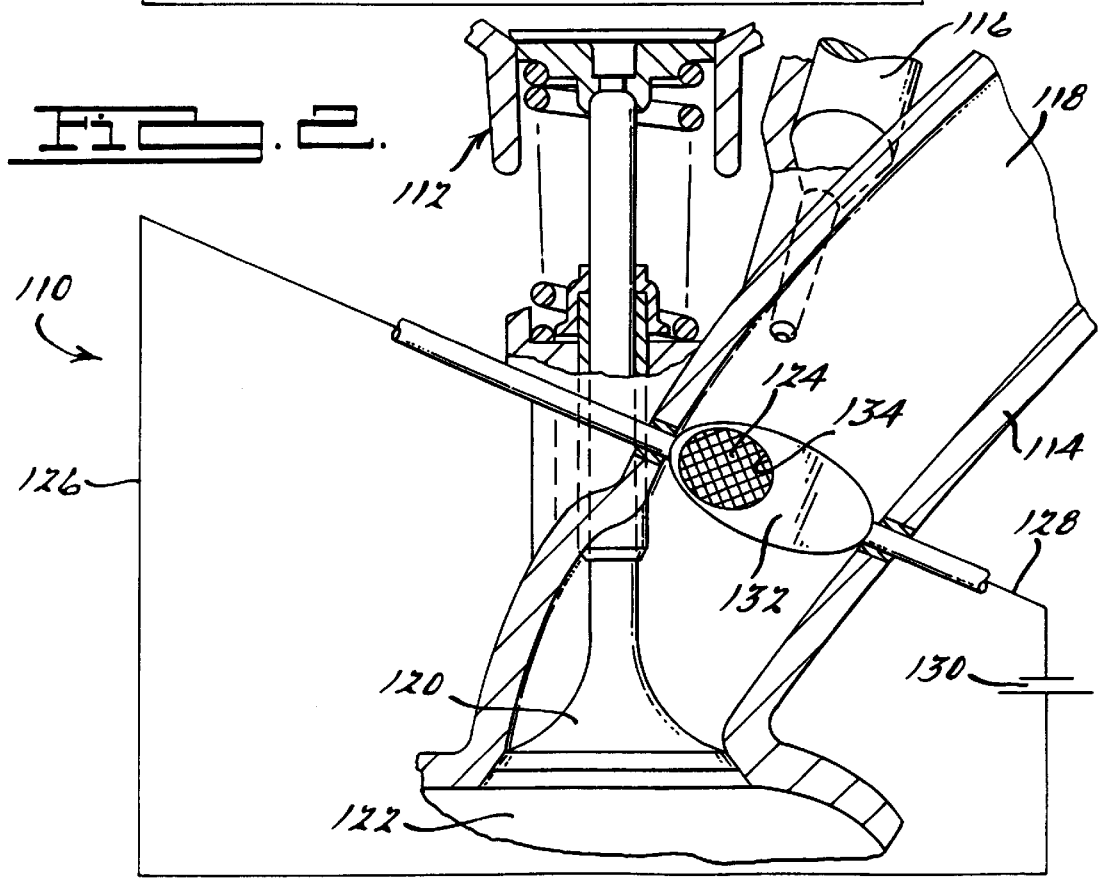
FIG. 2 is a fragmentary elevational view of another heated assembly, according to the present invention, illustrated in operational relationship with an internal combustion engine having a grid fixed in a throttle plate.

Referring to FIG. 2, another embodiment 110 of the heated assembly 110, according to the present invention, is illustrated. Like parts of the heated assembly 10 have like reference numerals increased by one hundred (100). The heated assembly 110 includes a turbulence-generating grid 124 mounted in the throttle plate 132 in a single inlet runner 118 of a single port induction system 114. The grid 124 is mounted fixed in an opening 134 in the rotatable throttle plate 132 and opens as the throttle plate 132 opens. The grid 124 is located so as to enhance swirl and turbulence during idle, cold start and/or low speed conditions. The heated assembly 110 includes electric cables 126 and 128 connected to the grid 124 and a power source such as the battery 130 to supply power to heat the grid 124. Also, computer control cables may be connected to the grid 124 to control the heating of the grid 124 and rotation of the throttle plate 132. The heated assembly 110 essentially accomplishes the same results as those seen with the above heated assembly 10, but is applicable to engines 112 with very restricted inlet manifolds where there is insufficient room to install a dual port induction system. It should be appreciated by those skilled in the art that the heated assembly 110 may require the attachment of guide vanes either to the walls of the inlet port or to the throttle plate in order to guide the incoming charge flow in the most desirable direction to improve mixing and swirl.

Figure 3:
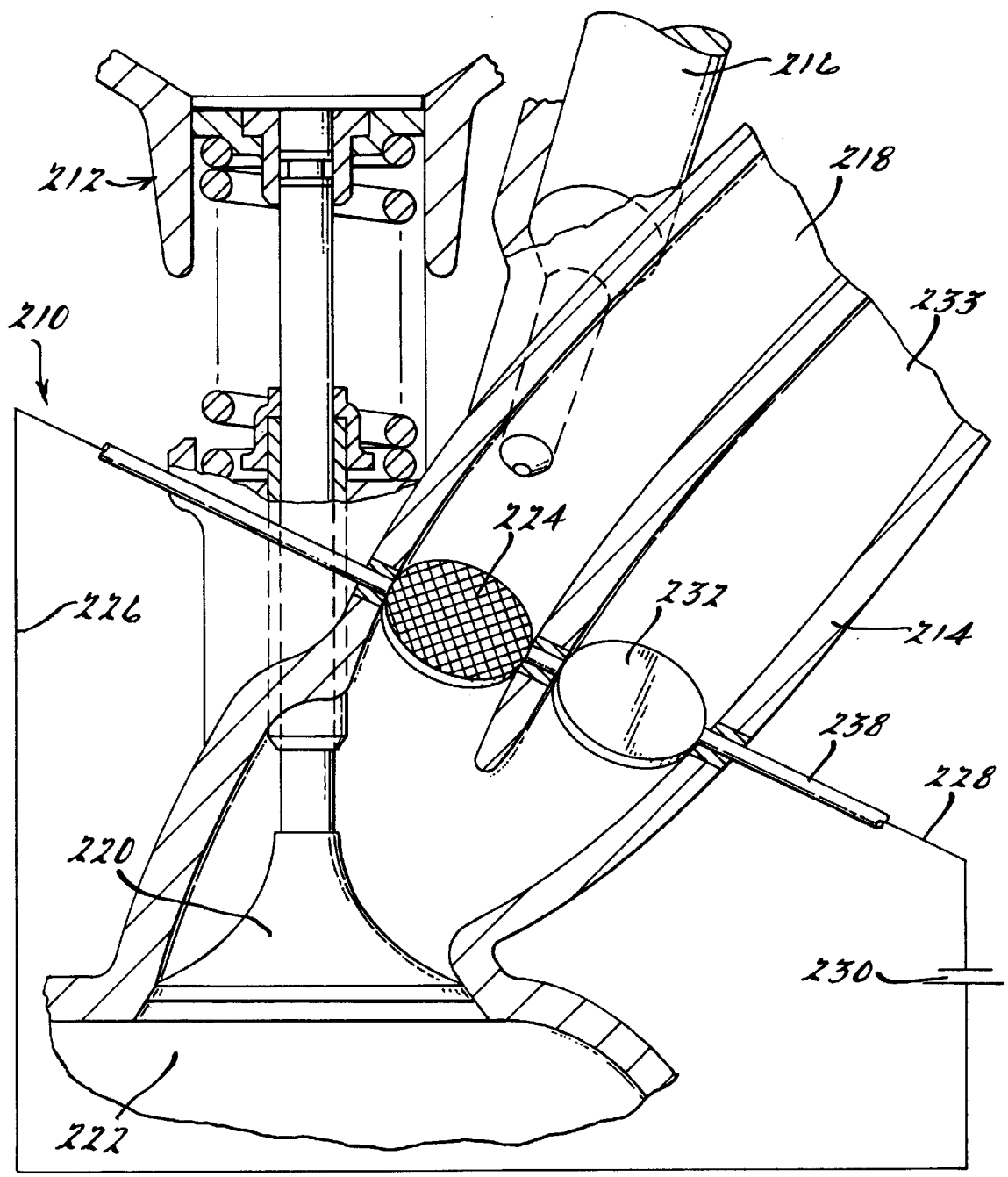
FIG. 3 is a fragmentary elevational view of yet another heated assembly, according to the present invention, illustrated in operational relationship with an internal combustion engine having a grid rotatable with a throttle plate.

Referring to FIG. 3, yet another embodiment 210 of the heated assembly 10, according to the present invention, is illustrated. Like parts of the heated assembly 10 have like reference numerals increased by two hundred (200). The heated assembly 210 is for a dual port induction system 214. The heated assembly 210 includes a grid 224 extending across the primary inlet runner 218 and mounted to a rotatable throttle shaft 238. The grid 224 is installed on the same rotatable throttle shaft 238 as the secondary throttle plate 230. The heated assembly 210 also includes electric cables 226 and 228 connected to the grid 224 and a power source such as the battery 230. The electric cables 226,228 and computer control cables (not shown) may extend through the throttle shaft 238. The throttle shaft 238 allows the grid 224 to be opened simultaneously with the secondary throttle plate 230 under high speed or heavy load conditions. The heated assembly 210 operates similar to the heated assembly 10 during cold start/idle conditions.

Figure 4:
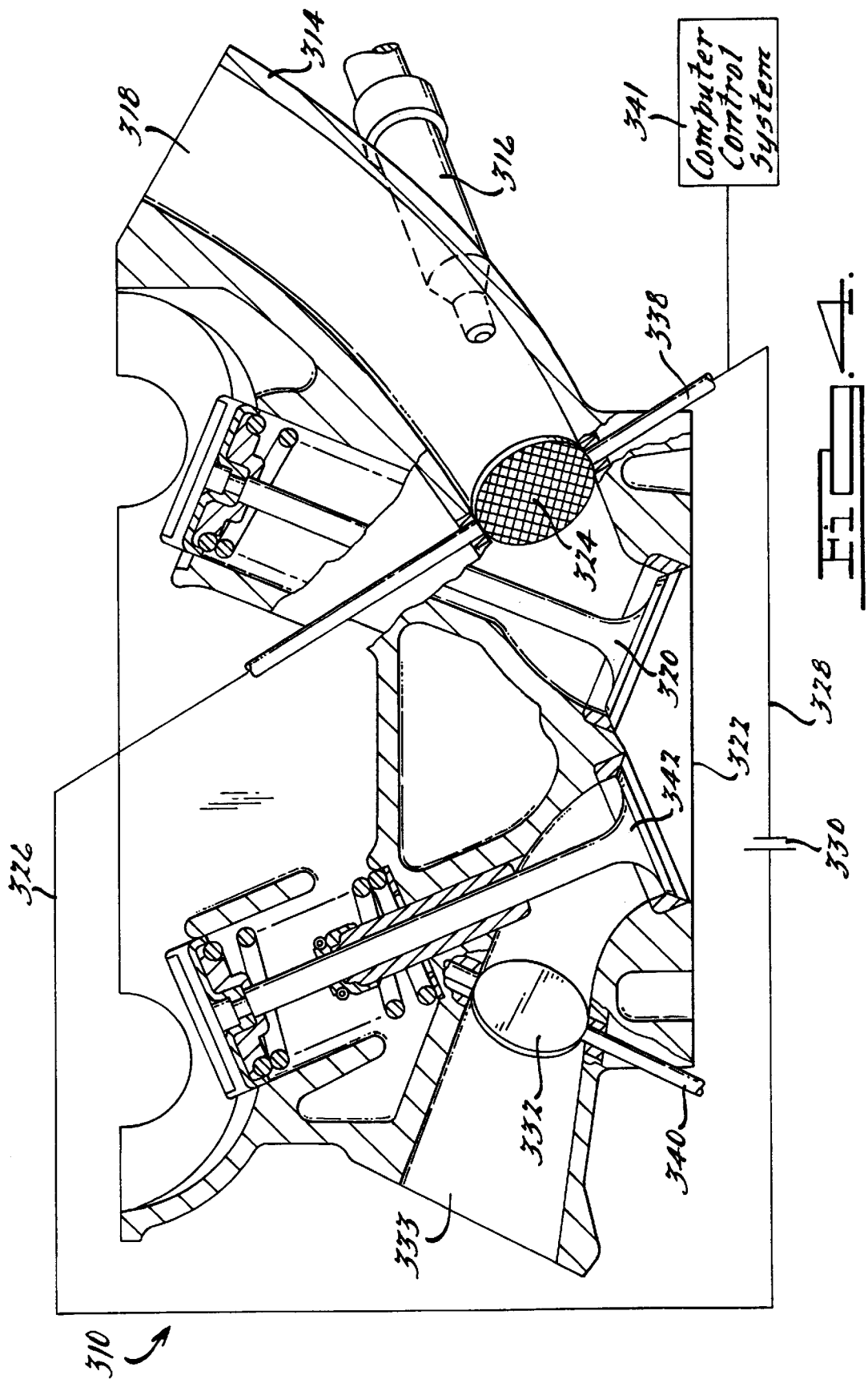
FIG. 4 is a fragmentary elevational view of still another heated assembly, according to the present invention, illustrated in operational relationship with an internal combustion engine having a grid rotatable in an inlet runner.

Referring to FIG. 4, still another embodiment 310 of the heated assembly 10, according to the present invention is illustrated. Like parts of the heated assembly 10 have like reference numerals increased by three hundred (300). The heated assembly 310 is for a divided port induction system 314 for a multiple inlet valve internal combustion engine 312. The divided port induction system 314 includes a primary inlet runner 318 and a secondary inlet runner 333 to transport the fuel/air mixture into the combustion chamber 320. The heated assembly 310 includes a grid 324 extending across the primary inlet runner 318 and mounted to the rotatable throttle shaft 338. Alternatively, the grid 324 could be installed in a fixed position in the primary inlet runner 318. The secondary throttle plate 332 is disposed in the secondary inlet runner 333 and rotated by a rotatable shaft 340. The secondary inlet runner 333 is opened by an inlet valve 342 to the combustion chamber 320. The secondary throttle plate 332 closes the secondary inlet runner 333 during low flow, start, and idle engine operating conditions. The primary inlet runner 318 is always open. The heated assembly 310 includes electric cables 326 and 328 connected to the grid 324 and a power source such as the battery 330. Also, computer control system 341 may be connected to the grid 324 to control the heating of the grid 324 and rotation of the rotatable shaft 338. For an engine 312 whose primary mode of mixing the inlet charge is "tumble", both inlet runners 318 and 333 could have rotational turbulence-generating grids 324 installed, the secondary being a mirror image of the primary. The heated assembly 310 operates similar to the heated assembly 10 during cold start/idle conditions. Referring to FIG. 5, another embodiment 410 of the heated assembly 10, according to the present invention, is illustrated. Like parts of the heated assembly 10 have like reference numerals increased by four hundred (400). The heated assembly 410 is used for a dual port induction system 414. The heated assembly 410 includes a hollow grid 424 across the primary inlet runner 418. The heated assembly 410 also includes a rotatable hollow heat pipe 450 connected to the hollow grid 424 and a stationary hollow heat pipe 451 connected to the pipe 452 and a secondary combustion chamber 452. The secondary combustion chamber 452 includes a high pressure fuel air injector 454 having a fuel inlet 456 from a fuel source (not shown) and an air inlet 458 from an air source (not shown) to provide a mixture of air and fuel therein. The secondary combustion chamber 452 includes a spark ignitor 460 to ignite the mixture and an exhaust pipe 462 connected to the primary inlet runner 418 upstream of the grid 424. The exhaust pipe 462 includes a valve 464 which is connected to and controlled by a controller (not shown). Preferably, the heat pipe 451 is insulated by insulation 466. The rotatable hollow heat pipe 450 is connected to the stationary hollow heat pipe 451 by rotatable high temperature and pressure seals 468. The primary inlet runner 418 is open during all phases of engine operation. The secondary throttle plate 432 is connected to the rotatable hollow heat pipe 450 and is closed during low speed operation. The heated assembly 410 chemically heats the grid by heat transfer of exhaust gases from the secondary combustion chamber 452 flowing through the heat pipes 450 and 451 during cold start idle engine operating conditions.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heated assembly for vaporization of fuel in an internal combustion engine comprising:

a grid disposed in an inlet runner of the internal combustion engine;

means for heating said grid during cold start of the internal combustion engine and vaporizing fuel in the inlet runner of the internal combustion engine;

a rotatable shaft, said grid being mounted to said shaft; and a secondary inlet runner having a throttle plate contained therein, said throttle plate being mounted to said shaft such that said grid and said throttle plate will open simultaneously.

2. A heated assembly for vaporization of fuel in an internal combustion engine comprising:

a grid disposed in an inlet runner of the internal combustion engine;

means for heating said grid during cold start of the internal combustion engine and vaporizing fuel in the inlet runner of the internal combustion engine;

a rotatable shaft, said grid being mounted to said shaft; and a secondary inlet runner having a rotatable shaft and a throttle plate connected to said rotatable shaft contained therein.

3. A heated assembly for vaporization of fuel in an internal combustion engine comprising:

a grid disposed in an inlet runner of the internal combustion engine;

means for heating said grid during cold start of the internal combustion engine and vaporizing fuel in the inlet runner of the internal combustion engine;

a rotatable shaft, said grid being mounted to said shaft;

wherein said shaft is hollow and said grid is hollow.

4. A heated assembly for vaporization of fuel in an internal combustion engine comprising:

a grid disposed in an inlet runner of the internal combustion engine;

means for heating said grid during cold start of the internal combustion engine and vaporizing fuel in the inlet runner of the internal combustion engine;

a rotatable shaft said grid being mounted to said shaft;

a secondary inlet runner having a throttle plate contained therein, said throttle plate being mounted to said shaft such that said grid and said throttle plate will open simultaneously;

wherein said shaft is hollow and said grid is hollow; and wherein said heating means comprises a secondary combustion chamber and a hollow heat pipe interconnecting said shaft and said secondary combustion chamber.

* * * * *